(12) United States Patent
Pandit et al.

(10) Patent No.: US 12,074,847 B2
(45) Date of Patent: Aug. 27, 2024

(54) ADVERTISING DEVICE INSPECTION CAPABILITIES TO ENHANCE NETWORK TRAFFIC INSPECTIONS

(71) Applicant: Cisco Technology, Inc., San Jose, CA (US)

(72) Inventors: Dipta Pandit, Hooghly (IN); Bhargava Jandhyala, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 17/335,642

(22) Filed: Jun. 1, 2021

(65) Prior Publication Data

US 2022/0385630 A1 Dec. 1, 2022

(51) Int. Cl.
*H04L 29/06* (2006.01)
*H04L 9/40* (2022.01)

(52) U.S. Cl.
CPC ...... *H04L 63/0209* (2013.01); *H04L 63/1408* (2013.01); *H04L 63/1425* (2013.01)

(58) Field of Classification Search
CPC ............. H04L 63/1425; H04L 63/0209; H04L 63/1408
See application file for complete search history.

(56) References Cited

U.S. PATENT DOCUMENTS

| | | | |
|---|---|---|---|
| 10,685,575 B1 * | 6/2020 | Pareek | G06T 7/0002 |
| 2005/0281194 A1 * | 12/2005 | Sonoda | H04L 1/22 |
| | | | 370/219 |
| 2010/0142371 A1 * | 6/2010 | Gooch | H04L 63/1408 |
| | | | 370/389 |
| 2011/0099631 A1 * | 4/2011 | Willebeek-LeMair | H04L 43/028 |
| | | | 726/23 |
| 2015/0341271 A1 * | 11/2015 | Cortes Gomez | H04L 47/11 |
| | | | 370/236 |
| 2020/0036610 A1 * | 1/2020 | Indiresan | H04L 69/22 |
| 2022/0385630 A1 * | 12/2022 | Pandit | H04L 63/0209 |

FOREIGN PATENT DOCUMENTS

EP 2321935 B1 6/2014

* cited by examiner

*Primary Examiner* — Dao Q Ho
(74) *Attorney, Agent, or Firm* — Lee & Hayes, P.C.

(57) ABSTRACT

Techniques for advertising device inspection capabilities to enhance network traffic inspections are described herein. The techniques may include determining, by a first inspection device of a network, that a second inspection device is disposed within the network. The first inspection device may also receive, from the second inspection device, an indication that the second inspection device is capable of performing a first type of inspection. The techniques may also include receiving, at the first inspection device, a packet that is to be sent through the network along a path that includes the second inspection device. Based at least in part on the path including the second inspection device, the first inspection device may refrain from performing the first type of inspection on the packet at the first inspection device such that the second inspection device can perform the first type of inspection on the packet.

20 Claims, 6 Drawing Sheets

┌─────────────────────────────────────────────────────────────┐
│ DETERMINE, BY A FIRST INSPECTION DEVICE OF A NETWORK, THAT A SECOND │
│ INSPECTION DEVICE IS DISPOSED WITHIN THE NETWORK, THE FIRST INSPECTION │
│ DEVICE AND THE SECOND INSPECTION DEVICE EACH CONFIGURED TO INSPECT │
│ TRAFFIC SENT THROUGH THE NETWORK │
│ 302 │
└─────────────────────────────────────────────────────────────┘
                                ↓
┌─────────────────────────────────────────────────────────────┐
│ RECEIVE, AT THE FIRST INSPECTION DEVICE AND FROM THE SECOND INSPECTION │
│ DEVICE, A FIRST INDICATION THAT THE SECOND INSPECTION DEVICE IS CAPABLE │
│ OF PERFORMING A FIRST TYPE OF INSPECTION │
│ 304 │
└─────────────────────────────────────────────────────────────┘
                                ↓
┌─────────────────────────────────────────────────────────────┐
│ RECEIVE, AT THE FIRST INSPECTION DEVICE, A PACKET THAT IS TO BE SENT │
│ THROUGH THE NETWORK ALONG A PATH THAT INCLUDES THE SECOND │
│ INSPECTION DEVICE │
│ 306 │
└─────────────────────────────────────────────────────────────┘
                                ↓
┌─────────────────────────────────────────────────────────────┐
│ BASED AT LEAST IN PART ON THE PATH INCLUDING THE SECOND INSPECTION │
│ DEVICE, REFRAIN FROM PERFORMING THE FIRST TYPE OF INSPECTION ON THE │
│ PACKET AT THE FIRST INSPECTION DEVICE SUCH THAT THE SECOND INSPECTION │
│ DEVICE PERFORMS THE FIRST TYPE OF INSPECTION ON THE PACKET │
│ 308 │
└─────────────────────────────────────────────────────────────┘

```
┌─────────────────────────────────────────────────────────────────┐
│ DETERMINE, AT A FIRST INSPECTION DEVICE OF A NETWORK, THAT A    │
│ SECOND INSPECTION DEVICE IS DISPOSED WITHIN THE NETWORK, THE    │
│ FIRST INSPECTION DEVICE AND THE SECOND INSPECTION DEVICE EACH   │
│ CONFIGURED TO INSPECT TRAFFIC SENT THROUGH THE NETWORK          │
│                              402                                │
└─────────────────────────────────────────────────────────────────┘
                                 │
                                 ▼
┌─────────────────────────────────────────────────────────────────┐
│ EXCHANGE, BETWEEN THE FIRST INSPECTION DEVICE AND THE SECOND    │
│ INSPECTION DEVICE, INSPECTION CAPABILITIES ASSOCIATED WITH THE  │
│ FIRST INSPECTION DEVICE AND THE SECOND INSPECTION DEVICE, THE   │
│ INSPECTION CAPABILITIES INDICATING THAT THE FIRST INSPECTION    │
│ DEVICE AND THE SECOND INSPECTION DEVICE ARE EACH CAPABLE OF     │
│ PERFORMING A FIRST TYPE OF INSPECTION ON TRAFFIC                │
│                              404                                │
└─────────────────────────────────────────────────────────────────┘
                                 │
                                 ▼
┌─────────────────────────────────────────────────────────────────┐
│ DETERMINE THAT THE FIRST INSPECTION DEVICE IS MORE CAPABLE OF   │
│ PERFORMING THE FIRST TYPE OF INSPECTION THAN THE SECOND         │
│ INSPECTION DEVICE                                               │
│                              406                                │
└─────────────────────────────────────────────────────────────────┘
                                 │
                                 ▼
┌─────────────────────────────────────────────────────────────────┐
│ RECEIVE, AT THE FIRST INSPECTION DEVICE, A PACKET THAT IS TO BE │
│ SENT ALONG A PATH THROUGH THE NETWORK, THE PATH INCLUDING THE   │
│ SECOND INSPECTION DEVICE                                        │
│                              408                                │
└─────────────────────────────────────────────────────────────────┘
                                 │
                                 ▼
┌─────────────────────────────────────────────────────────────────┐
│ BASED AT LEAST IN PART ON THE PATH INCLUDING THE SECOND         │
│ INSPECTION DEVICE AND BASED AT LEAST IN PART ON DETERMINING     │
│ THAT THE FIRST INSPECTION DEVICE IS MORE CAPABLE OF PERFORMING  │
│ THE FIRST TYPE OF INSPECTION THAN THE SECOND INSPECTION DEVICE, │
│ PERFORM THE FIRST TYPE OF INSPECTION ON THE PACKET AT THE FIRST │
│ INSPECTION DEVICE                                               │
│                              410                                │
└─────────────────────────────────────────────────────────────────┘
```

ADVERTISING DEVICE INSPECTION CAPABILITIES TO ENHANCE NETWORK TRAFFIC INSPECTIONS

TECHNICAL FIELD

The present disclosure relates generally to improving security inspections of traffic sent through a network.

BACKGROUND

A typical network can contain a number of different devices, each configured with different inspection capabilities for different types of traffic. When traffic is sent through the network, these devices can inspect the traffic to protect the network or devices associated with the network from attacks. Generally, traffic is inspected on a first encounter basis when the traffic is received by a capable device. However, this results in underutilization of a complete security portfolio deployed for a network. Additionally, this can also result in different devices engaging in duplicate/redundant inspection.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various techniques for security/inspection devices to advertise their inspection capabilities and tune their inspection configurations to, among other things, improve utilization of network security portfolios and/or reduce, or even eliminate, duplicate/redundant inspection of traffic sent through the network. By way of examples, and not limitation, a method according to the various techniques described in this disclosure may include determining, at a first inspection device of a network, that a second inspection device is disposed within the network, the first inspection device and the second inspection device each configured to inspect traffic sent through the network. The method may also include receiving, at the first inspection device and from the second inspection device, a first indication that the second inspection device is capable of performing a first type of inspection. Additionally, the first inspection device may receive a packet that is to be sent through the network along a path that includes the second inspection device. Based at least in part on the path including the second inspection device, the first inspection device may refrain from performing the first type of inspection on the packet at the first inspection device such that the second inspection device performs the first type of inspection on the packet.

The techniques described herein may additionally, or alternatively, be performed by a system and/or device having non-transitory computer-readable media storing computer-executable instructions that, when executed by one or more processors, performs the method described above.

Example Embodiments

As noted above, a typical network can contain a number of different devices, each configured with different inspection capabilities for different types of traffic. When traffic is sent through the network, these devices can inspect the traffic to protect the network or devices associated with the network from attacks. Generally, traffic is inspected on a first encounter basis when the traffic is received by a capable device. However, this results in underutilization of a complete security portfolio deployed for a network. Additionally, this can also result in different devices engaging in duplicate/redundant inspection. There is no current way for devices to automatically elect the best device in the network to inspect traffic based on the traffic type and abilities of the inspection device.

Accordingly, this disclosure describes techniques for security/inspection devices of a network to advertise their inspection capabilities to other security/inspection devices and, based at least in part on this advertisement of inspection capabilities, the security/inspection devices may tune their inspection configurations. Among other things, these techniques improve utilization of network security portfolios, as well as reduce, or even eliminate, duplicate and/or redundant inspection of traffic sent through the network. Furthermore, by performing these techniques for advertising inspection capabilities, a security/inspection device may automatically adjust its security/inspection configuration based on inspection capabilities of surrounding devices to better utilize its own capabilities, and the capabilities of the other devices, by automatically electing the best device in the network to inspect particular traffic.

In some examples, the security/inspection devices that implement these techniques may have a common enumeration for all supported inspection capabilities (e.g., URL filtering, IP filtering, email inspection, spam detection, malware cloud lookup, etc.) for a group of devices. The enumeration scheme may depend on the implementing group of devices, and the enumeration may be built into the implementing devices. Additionally, in some examples, any security/inspection device that is enabled or configured to perform inspection capabilities advertisement (hereinafter referred to herein as an "ICA enabled device"), when deployed in a network, may discover other ICA enabled devices in the network. For instance, this may be achieved by automatic network discovery or by manual configuration of the ICA enabled device.

In some examples, a group of ICA enabled devices may negotiate a security key for each pair using an out-of-band secure channel such that a first ICA enabled device may advertise its own inspection capabilities with one or more other ICA enabled devices. In at least one example, the first ICA enabled device may advertise its inspection capabilities with a second ICA enabled device by reusing the out-of-band secure channel. This may not require the negotiated security key and the key negotiation may be optional in this method. Additionally, or alternatively, in at least one example the first ICA enabled device may inform the second ICA enabled device about its inspection capabilities by using TCP options while forwarding traffic. For instance, the TCP option data may be encrypted using the negotiated key.

In some examples, the first ICA enabled device can defer inspection to a more appropriate ICA enabled device by forwarding the un-inspected traffic and watermarking one or more packets of the traffic flow with the inspection performed by the ICA enabled device. For example, the first ICA enabled device may be capable of inspecting URL, email, and malware and may choose not to inspect an email attachment for malware if the second ICA enabled device in the next hop specializes in malware detection. In this case, the first ICA enabled device may watermark the packets of the traffic flow with an "inspection performed" value indicating that the first ICA enabled device has inspected the email body. Additionally, in some examples the watermark may indicate the first ICA enabled device's capabilities, as well as which inspection the first ICA enabled device performed.

In some examples, upon receipt of the second ICA enabled device's inspection capabilities, the first ICA enabled device may tune its configuration to perform only necessary inspection, thereby reducing redundant inspections. Similarly, on receipt of the "inspection performed" notification in a flow, the ICA device will only perform inspection that has not already been done.

As another example, consider a network in which two security/inspection devices are deployed, namely the first ICA enabled device and the second ICA enabled device. We will assume, for example, that the first ICA enabled device is capable of IP filtering, URL filtering, malware detection, email spam detection, and email filtering. We will also assume that the second ICA enabled device, in contrast, is capable of malware detection, email spam detection, and email filtering. After the first ICA enabled device is deployed and the second ICA enabled device is deployed, they may detect that they are neighboring devices that support ICA either automatically by a modified device discovery mechanism or manually by configuration.

After detecting one another, the first ICA enabled device and the second ICA enabled device may proceed to advertise their inspection capabilities in two different ways based on their implementation. For each of these two ways, the first ICA enabled device and the second ICA enabled device may create a secure channel in-between them. In the first way (e.g., an out-of-band mode), the first ICA enabled device and the second ICA enabled device may advertise their respective inspection capabilities using the secure channel along with their device identifier. By contrast, in the second way (e.g., an in-band mode), the first ICA enabled device and the second ICA enabled device may negotiate a key using the secure channel to encrypt part of their TCP header to transmit the ICA message securely. For instance, the first ICA enabled device and the second ICA enabled device may use an extended TCP option to communicate the ICA message to each other.

After consuming the ICA message, the first ICA enabled device may modify its configuration/rule to only perform IP filtering and URL filtering for traffic which will have the second ICA enabled device in its next hop. Now, if network traffic containing an email, for instance, reaches the first ICA enabled device and if the traffic is destined to be forwarded to the second ICA enabled device, the first ICA enabled device may only perform IP filtering and/or URL filtering (if necessary) on the packets of the traffic and leave a watermark in one or more packets of the traffic flow indicating whether the first ICA enabled device performed any of those inspections. In this way, upon receiving the watermarked packets of the traffic flow, the second ICA enabled device may perform all inspections of which it is capable of performing on the flow, namely malware detection, email spam detection, and email filtering.

In these ways, and in other ways as described herein, utilization of network security portfolios may be improved, as well as reducing, or even eliminating, duplicate and/or redundant inspection of traffic sent through the network. Furthermore, by performing these techniques for advertising inspection capabilities, an ICA enabled device may automatically adjust its security/inspection configuration based on inspection capabilities of surrounding ICA enabled devices to better utilize its own capabilities, as well as the capabilities of the surrounding ICA enabled devices, by automatically electing the best ICA enabled device in the network to inspect particular traffic. These advantages, as well as other improvements and advantages not listed above, will be easily apparent to those having ordinary skill in the art.

By way of example, and not limitation, a method according to the techniques described herein may include determining, by a first inspection device of a network, that a second inspection device is disposed within the network, the first inspection device and the second inspection device each configured to inspect traffic sent through the network. The first inspection device and the second inspection device may detect that they are neighboring devices that support ICA. The inspection devices may detect this either automatically, by a modified device discovery mechanism, or manually, by configuration.

The method may also include, in some examples, receiving, at the first inspection device and from the second inspection device, a first indication that the second inspection device is capable of performing at least a first type of inspection (e.g., URL filtering, IP filtering, email inspection, email spam detection, malware detection, etc.). In some instances, a secure communication channel may be established between the first inspection device and the second inspection device. The first inspection device and the second inspection device may negotiate a key using this secure communication channel and, in some examples, the key may be used to send/receive the first indication. Additionally, or alternatively, the first indication may be received via the secure communication channel. In some examples, the first inspection device may also be capable of performing at least the first type of inspection. Additionally, the first inspection device may send a second indication to the second inspection device, for instance, via the secure communication channel. The second indication may indicate that the first inspection device is capable of performing the first type of inspection and/or a second type of inspection.

In some examples, based at least in part on receiving the first indication, the first inspection device may alter its security/inspection configuration such that the first inspection device refrains from performing the first type of inspection on subsequent packets that are to be sent along the path through the network that includes the second inspection device. For instance, the first inspection device may determine that the second inspection device is more capable of performing the first type of inspection for certain type of traffic (e.g., the second inspection device has more resources devoted to performing the first type of inspection, the second inspection device is specialized at performing the first type of inspection on a specific type of traffic (e.g., email), and the like).

In some examples, the method may also include receiving, at the first inspection device, a packet that is to be sent through the network along a path that includes the second inspection device. For instance, the second inspection device may be the next hop for the packet along the path through the network. Based at least in part on the path including the second inspection device, the first inspection device may refrain from performing the first type of inspection on the packet at the first inspection device so that, instead, the second inspection device can perform the first type of inspection on the packet.

In some examples, the first inspection device may associate metadata (e.g., watermark) with the packet prior to forwarding the packet toward the second inspection device. The metadata may indicate that the first inspection device refrained from performing the first type of inspection on the packet and/or one or more other types of inspections that the first inspection device performed on the packet. For instance, although the first inspection device may refrain from performing the first type of inspection on the packet, the first inspection device may perform a second type of inspection on the packet. The first inspection device may be more capable than the second inspection device to perform the second type of inspection. In this way, based at least in part on the metadata being associated with the packet, the second inspection device, upon receiving the packet, may refrain from performing the second type of inspection.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
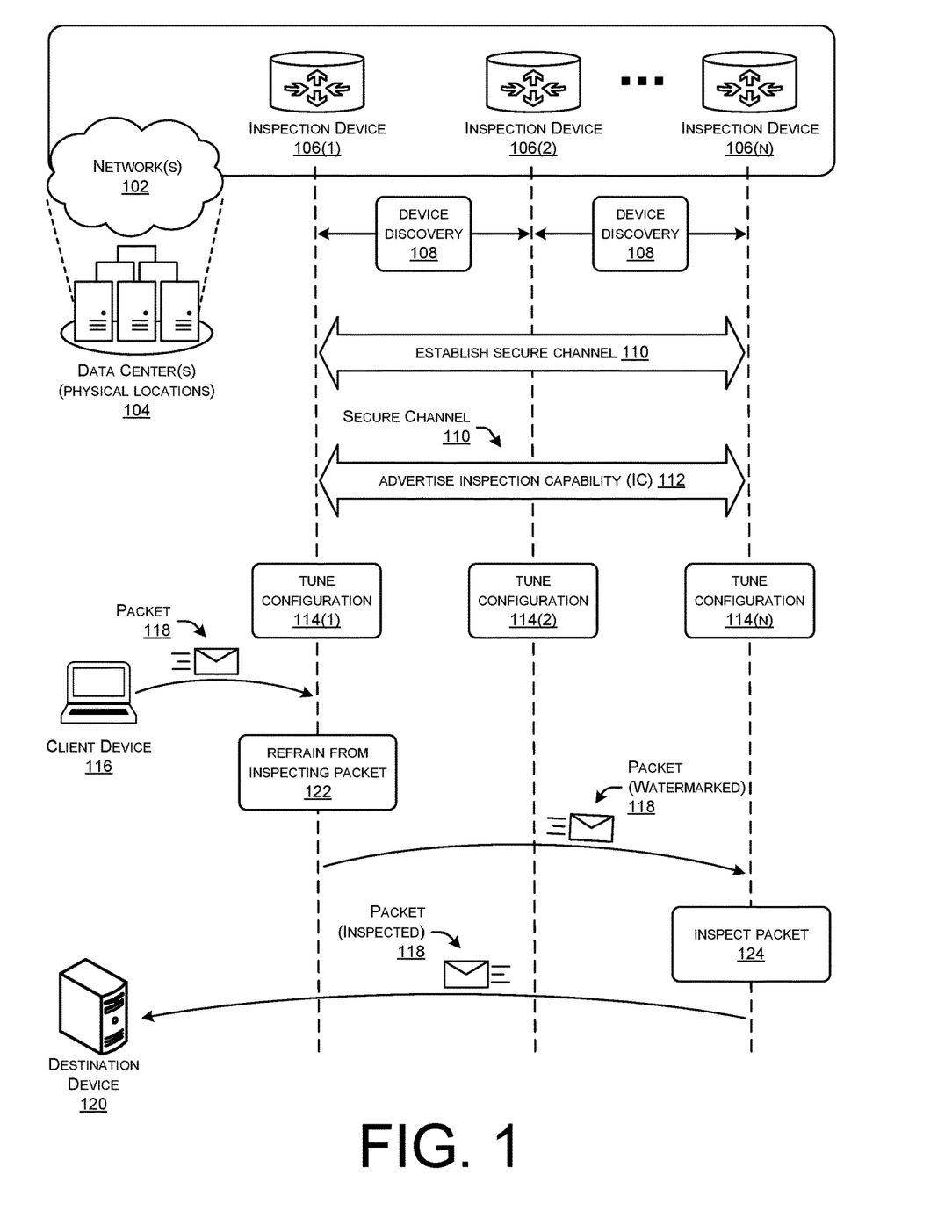
FIG. 1 is a system-architecture diagram illustrating an example architecture 100 in which a group of inspection devices advertise their respective inspection capabilities and tune their inspection configurations to improve network security portfolio utilization and/or reduce redundant inspections.

FIG. 1 is a system-architecture diagram illustrating an example architecture 100 in which a group of inspection devices 106(1), 106(2), . . . and 106(N) (where N may be any number greater than or equal to one) advertise their respective inspection capabilities and tune their inspection configurations to improve network security portfolio utilization and/or reduce redundant inspections. The networks 102 may include one or more networks implemented by any viable communication technology, such as wired and/or wireless modalities and/or technologies. The networks 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networks 102 may include devices, virtual resources, or other nodes that relay packets from one network segment to another by nodes in the networks 102.

The one or more data centers 104 may be physical facilities or buildings located across geographic areas that are designated to store networked devices that are part of the networks 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), networking (bandwidth), security, and the like. However, in some examples the devices in the networks 102 may not be located in explicitly defined data centers 104 but may be located in other locations or buildings.

The networks 102 may include any type of networking device, such as servers, switches, routers, hubs, bridges, gateways, modems, repeaters, access points, etc. As illustrated, the networks 102 may include one or more inspection devices 106(1), 106(2), . . . and 106(N) (hereinafter referred to collectively as "inspection devices 106"). These inspection devices 106 may comprise any type of networking device capable of forwarding packets in the networks 102 and inspecting/filtering packets. The inspection devices 106 may define one or more multi-hop paths through the networks 102. Although illustrated as physical devices, in some examples, the inspection devices 106 may comprise virtual resources or virtual nodes in the networks 102.

In some instances, as shown by operation 108, the inspection devices 106 may discover other inspection devices of the networks 102. For instance, the inspection device 106(1) may discover the inspection devices 106(2) and/or 106(N). Similarly, the inspection device 106(2) may discover the inspection devices 106(1) and/or 106(N), and the inspection device 106(N) may discover the inspection devices 106(1) and/or 106(2). In some examples, discovering the other inspection devices 106 may be based on each of the inspection devices 106 being configured as an inspection capabilities advertisement (ICA) enabled device.

After the inspection devices 106 discover each other, the inspection devices 106 may establish a secure channel 110 between each other. For instance, the inspection devices 106(1) and 106(2) may establish a secure channel 110 between themselves, the inspection devices 106(2) and 106(N) may establish another secure channel 110 between themselves, and the inspection devices 106(1) and 106(N) may establish another secure channel 110 between themselves. In some examples, each pair of inspection devices (e.g., inspection devices 106(1) and 106(2)) may establish their own secure channel 110. Additionally, or alternatively, a secure channel 110 may be established between multiple of the inspection devices 106 such that each of the inspection devices 106(1), 106(2), and 106(N) may all communicate using the same secure channel 110.

In some examples, as shown by operation 112, the inspection devices 106 may advertise their inspection capabilities to one another. For instance, the inspection device 106(1) may advertise its inspection capabilities to the inspection device 106(2) using the secure channel 110. Similarly, the inspection device 106(2) may advertise its inspection capabilities to the inspection device 106(1) using the same secure channel 110. Additionally, the inspection devices 106(1) and 106(2) may exchange their inspection capabilities during a same period of time.

Based on the exchanged inspection capabilities, at operations 114(1), 114(2), and 114(N), the inspection devices 106(1), 106(2), and 106(N), respectively, may tune their inspection configurations. For instance, if inspection device 106(1) is capable of performing every enumerated type of inspection and inspection device 106(2) is capable of performing only a first type of inspection, then the inspection device 106(1) may tune its configuration such that the inspection device 106(1) refrains from performing the first type of inspection on received packets that are to be forward to the inspection device 106(2).

By way of example, as shown in FIG. 1, a client device 116 may send a packet 118 to the destination device 120. In doing so, the packet 118 may be routed through the network 102 along a path that includes the inspection devices 106(1) and 106(N). When the inspection device 106(1) receives the packet 118 from the client device 116, the inspection device 106(1) may determine that the next hop device where the packet 118 is to be forwarded is the inspection device 106(N). Accordingly, the inspection device 106(1) may, at operation 122, refrain from inspecting the packet. In some examples, the inspection device 106(1) may refrain from performing any inspection on the packet 118, and in other examples the inspection device 106(1) may refrain from performing specific types of inspections on the packet 118. For instance, if the inspection device 106(N) is more capable of performing a first type of inspection than is the inspection device 106(1), then the inspection device 106(1) may refrain from performing the first type of inspection on the packet 118. Additionally, the inspection device 106(1) may watermark the packet 118 to indicate, for instance, one or more inspections performed on the packet 118 by the inspection device 106(1), one or more inspections the inspection device 106(1) refrained from performing on the packet 118, that the packet 118 was routed through the inspection device 106(1), and/or the like.

When the inspection device 106(N) receives the watermarked packet 118 from the inspection device 106(1), the inspection device 106(N) may inspect the packet 118 at operation 124. For example, based at least in part on the watermark of the packet 118, the inspection device 106(N) may determine that it is to perform one or more types of inspections on the packet 118. Additionally, or alternatively, the inspection device 106(N) may determine to inspect the packet based on its own, tuned inspection configuration. For instance, the inspection device 106(N) may be the only one of the inspection devices 106 that is enabled and/or configured to perform a first type of inspection (e.g., malware detection). As such, the configuration of the inspection device 106(N) may be to perform the first type of inspection on all packets received and/or on packets received from the inspection device 106(1). After performing the inspection, the inspection device 106(N) may send the inspected packet 118 to the destination device 120.

Figure 2:
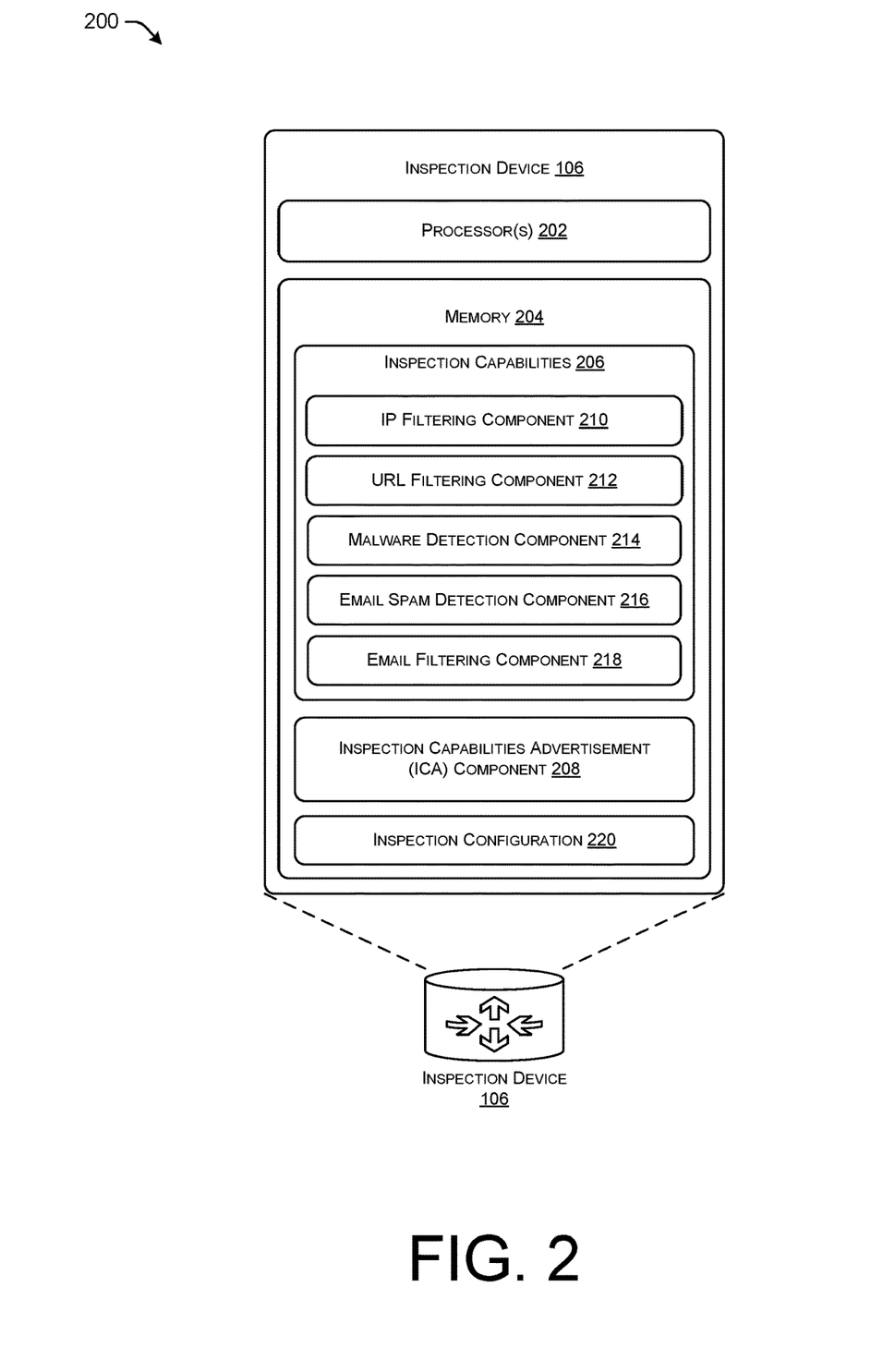
FIG. 2 is a block diagram illustrating example detail of an inspection device (e.g., an inspection capabilities advertisement (ICA) enabled device).

FIG. 2 is a block diagram illustrating example detail 200 of an inspection device 106 (e.g., an inspection capabilities advertisement (ICA) enabled device). As shown, the inspection device 106 may include one or more processors 202 and memory 204 that is communicatively coupled with the one or more processors 202.

The memory 204 of the inspection device 106 may store one or more inspection capabilities 206 and an inspection capabilities advertisement (ICA) component 208. The inspection capabilities 206 of the inspection device 106 may include an IP filtering component 210, a URL filtering component 212, a malware detection component 214, an email spam detection component 216, and an email filtering component 218. The ICA component 208 may include functionality for the inspection device 106 to advertise its own inspection capabilities to other inspection devices, as well as functionality for the inspection device 106 to receive inspection capabilities advertisements from other inspection devices.

The memory 204 of the inspection device 106 may further include an inspection configuration 220. The inspection configuration 220 may be updated based on receiving inspection capabilities of other inspection devices, as well as the inspection device's 106 own inspection capabilities. For instance, if the inspection device 106 receives inspection capabilities from another inspection device, the inspection configuration 220 may be updated such that the "best" inspection device performs certain inspections on traffic sent through the inspection device 106 and the other inspection device.

Figure 3:
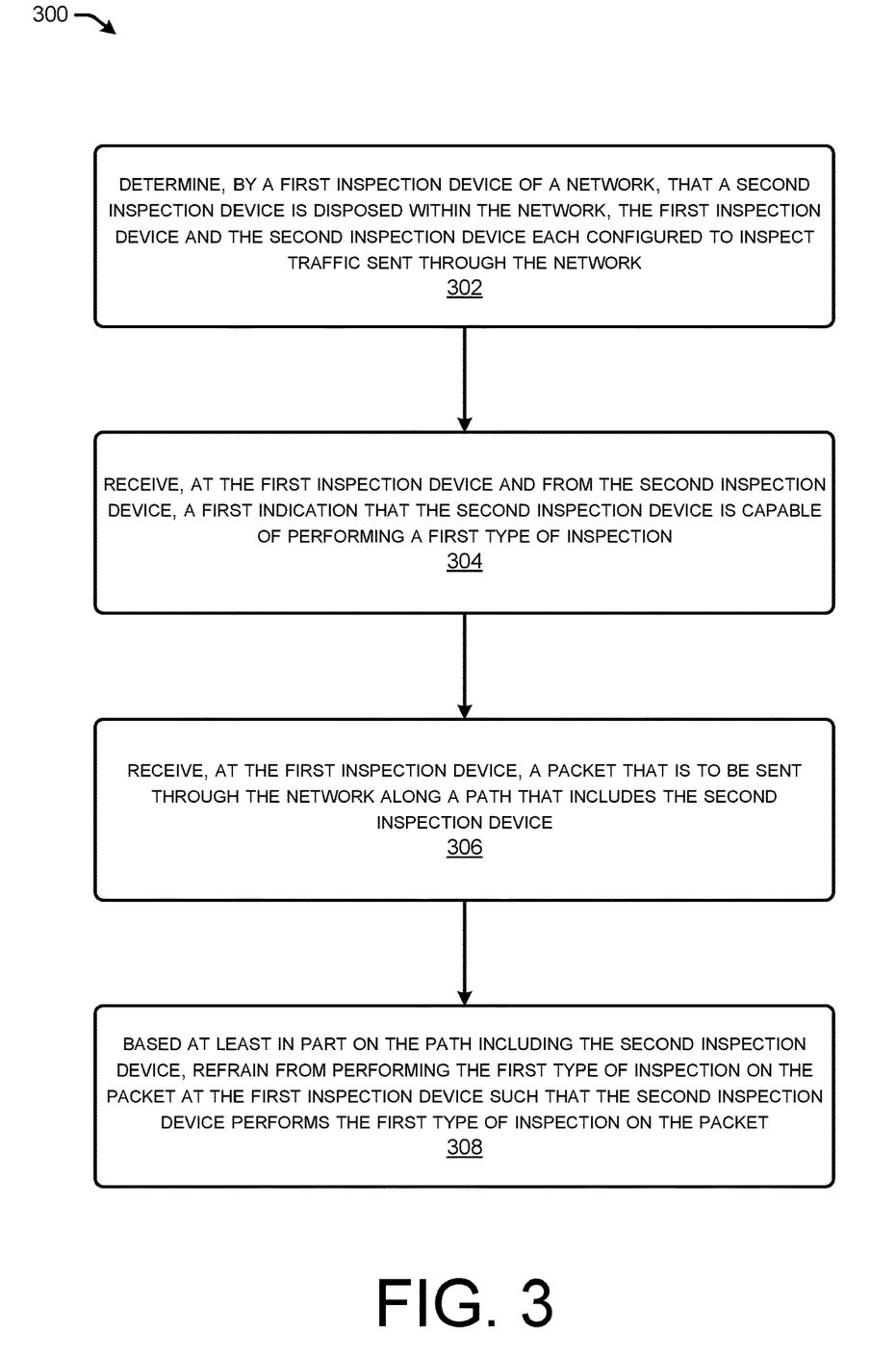
FIG. 3 is a flow diagram illustrating an example method that may be performed at least partly by a first inspection device to tune its inspection configuration based on receiving inspection capabilities of a second inspection device.
Figure 4:
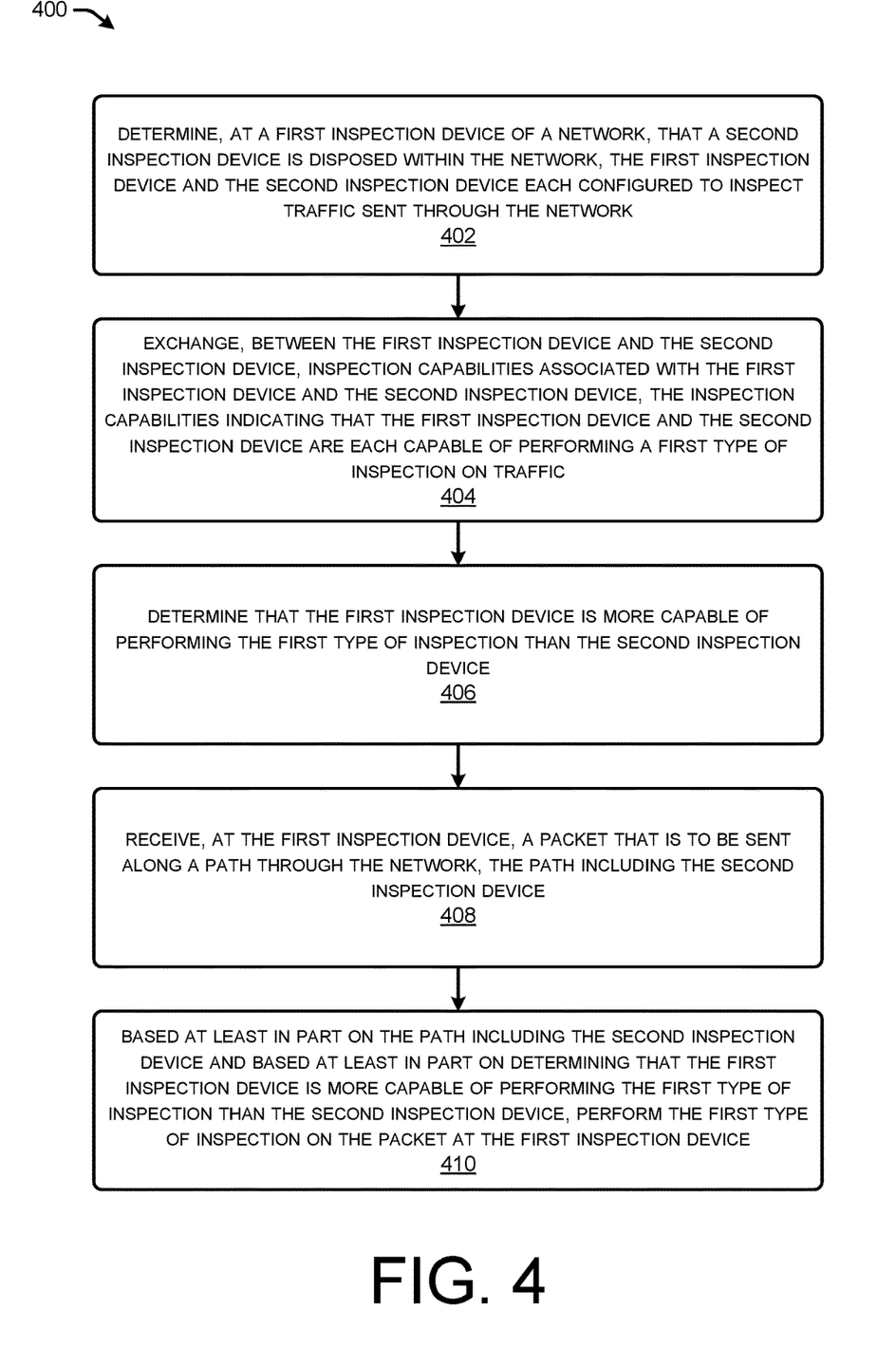
FIG. 4 is a flow diagram illustrating another example method that may be performed at least partly by a first inspection device to tune its inspection configuration based on receiving inspection capabilities of a second inspection device.

FIGS. 3 and 4 illustrate flow diagrams of example methods 300 and 400 that illustrate aspects of the functions performed at least partly by the inspection devices 106 in the networks 102 as described in FIG. 1. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 is a flow diagram illustrating an example method 300 that may be performed at least partly by a first inspection device (e.g., inspection device 106(1)) to tune its inspection configuration (e.g., inspection configuration 220) based on receiving inspection capabilities of a second inspection device.

The method 300 begins at operation 302, which includes determining, by a first inspection device of a network, that a second inspection device is disposed within the network, the first inspection device and the second inspection device each configured to inspect traffic sent through the network. For instance, the inspection device 106(1) may determine that the inspection device 106(2) is disposed within the networks 102.

At operation 304, the method 300 includes receiving, at the first inspection device and from the second inspection device, a first indication that the second inspection device is capable of performing a first type of inspection. For instance, the inspection device 106(1) may receive a message indicating inspection capabilities of the inspection device 106(2).

At operation 306, the method 300 includes receiving, at the first inspection device, a packet that is to be sent through the network along a path that includes the second inspection device. For instance, a packet 118 may be received by the inspection device 106(1), and the next-hop device in which the packet 118 is to be sent may be the inspection device 106(2) or, as shown in FIG. 1, inspection device 106(N).

At operation 308, the method 300 includes, based at least in part on the path including the second inspection device, refraining from performing the first type of inspection on the packet at the first inspection device such that the second inspection device performs the first type of inspection on the packet. For instance, the inspection device 106(1) may refrain from inspecting the packet 118 based at least in part on the next-hop device being the inspection device 106(2) or 106(N), and the inspection device 106(2) or 106(N) may be more capable of performing the inspection on the packet 118 than the inspection device 106(1).

FIG. 4 is a flow diagram illustrating another example method 400 that may be performed at least partly by a first inspection device (e.g., inspection device 106(1)) to tune its inspection configuration based on receiving inspection capabilities of second inspection device (e.g., inspection device 106(2) and/or 106(N)).

The method 400 begins at operation 402, which includes determining, at a first inspection device of a network, that a second inspection device is disposed within the network, the first inspection device and the second inspection device each configured to inspect traffic sent through the network. For instance, the inspection device 106(1) may determine that the inspection device 106(2) is disposed within the networks 102.

At operation 404, the method 400 includes exchanging, between the first inspection device and the second inspection device, inspection capabilities associated with the first inspection device and the second inspection device, the inspection capabilities indicating that the first inspection device and the second inspection device are each capable of performing a first type of inspection on traffic. For instance, the inspection devices 106 may exchange their inspection capabilities information with each other.

At operation 406, the method 400 includes determining that the first inspection device is more capable of performing the first type of inspection than the second inspection device. For instance, the inspection device 106(1) may determine that it is more capable of performing the first type of inspection than the inspection device 106(2) and/or 106(N).

At operation 408, the method 400 includes receiving, at the first inspection device, a packet that is to be sent along a path through the network, the path including the second inspection device. For instance, the inspection device 106(1) may receive a packet 118 from a client device 116 that is to be sent through the networks 102, and a next-hop of the path may be the inspection device 106(2) or, as shown in FIG. 1, inspection device 106(N).

At operation 410, the method 400 includes, based at least in part on the path including the second inspection device and based at least in part on determining that the first inspection device is more capable of performing the first type of inspection than the second inspection device, performing the first type of inspection on the packet at the first inspection device. For instance, the inspection device 106(1) may determine to perform the first type of inspection on the packet 118 based at least in part on the inspection device 106(1) being more capable than the inspection device 106(2) and/or 106(N), as well as based at least in part on the next hop device being the inspection device 106(2) and/or 106(N).

Figure 5:
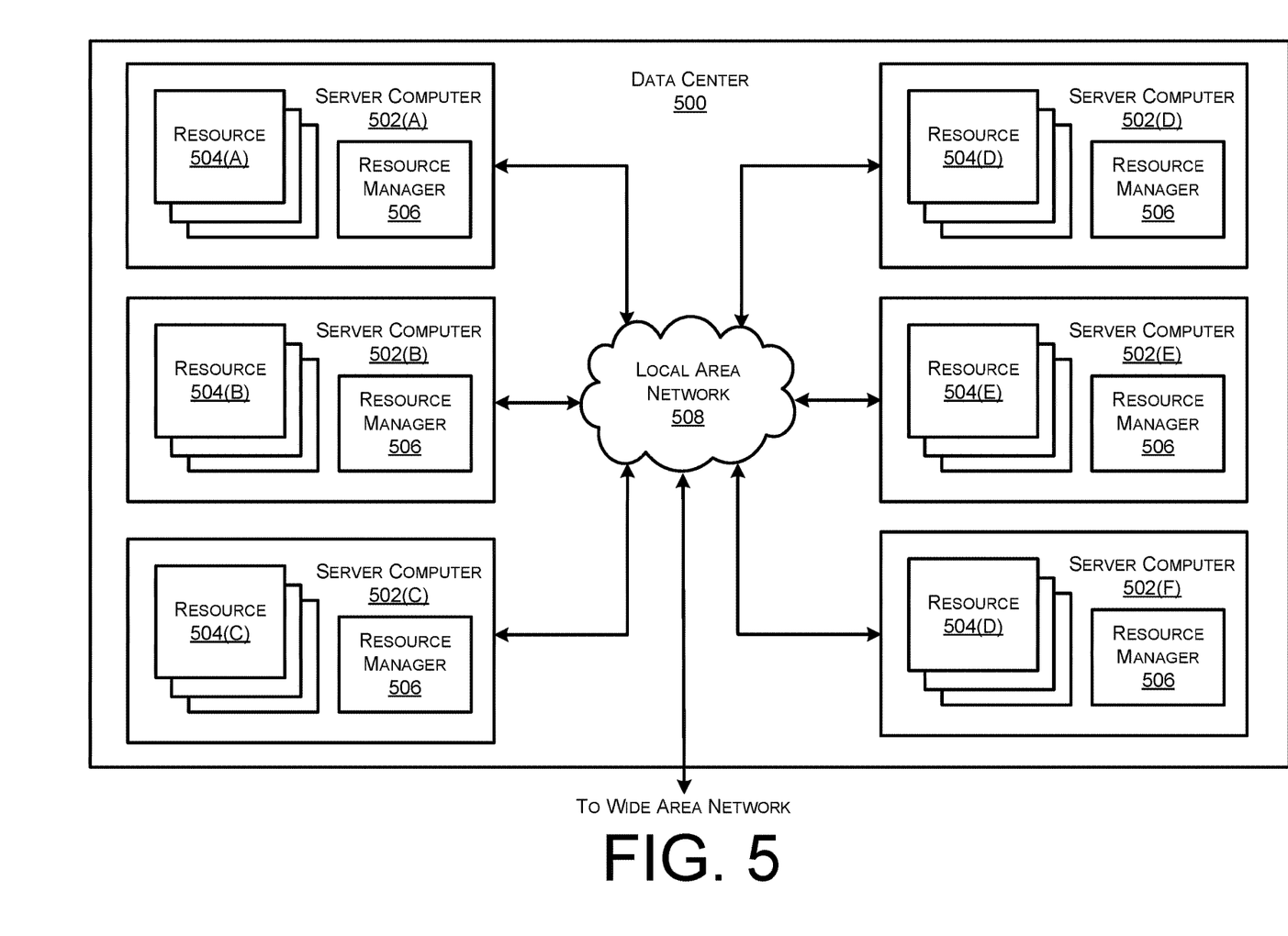
FIG. 5 is a computing system diagram illustrating an example configuration of a data center that can be utilized to implement aspects of the technologies disclosed herein.

FIG. 5 is a computing system diagram illustrating an example configuration of a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, any type of networked device described herein, such as the inspection devices 106. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, security, packet inspection, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate local area network (LAN) 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein. For instance, the containers and/or virtual machines may serve as nodes in the networks 102.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
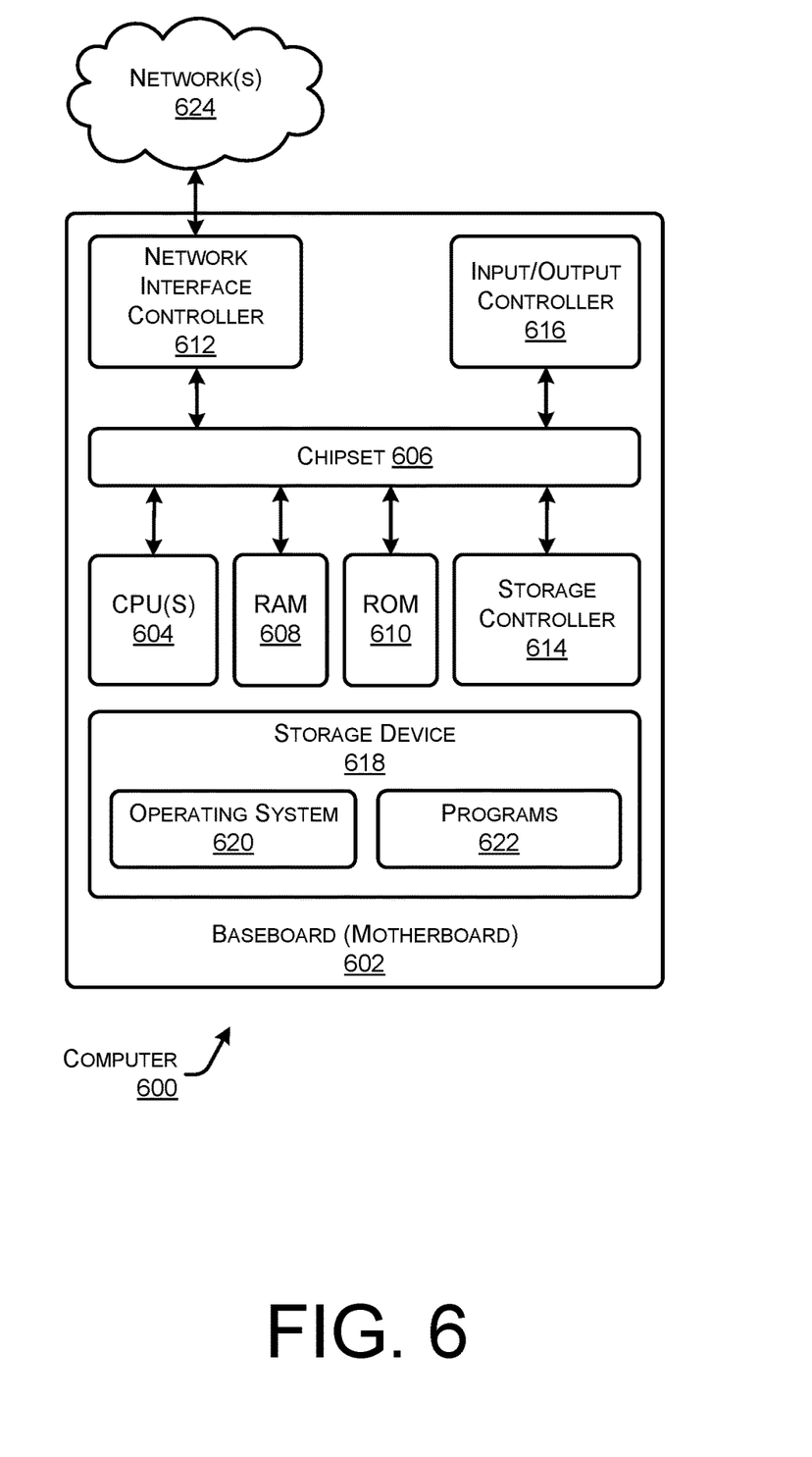
FIG. 6 is a computer architecture diagram illustrating an example computer hardware architecture for implementing an inspection device that can be utilized to implement aspects of the various technologies presented herein.

FIG. 6 is a computer architecture diagram illustrating an example computer hardware architecture for implementing an inspection device that can be utilized to implement aspects of the various technologies presented herein. The computer 600 shown in FIG. 6 illustrates a conventional server computer 502, inspection device 106, workstation, desktop computer, laptop, tablet, network appliance, e-reader, smartphone, and/or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 may operate in a networked environment using logical connections to remote computing devices and computer systems through a network, such as the networks 624. The chipset 606 can include functionality for providing network connectivity through a NIC 612, such as a gigabit Ethernet adapter. The NIC 612 is capable of connecting the computer 600 to other computing devices over the networks 624 (and/or 102). It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the networks 102, and or any components included therein, may be supported by one or more devices similar to computer 600. Stated otherwise, some or all of the operations performed by the networks 102, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of an inspection device 106, client device 116, and/or destination device 120. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the inspection devices 106, client device 116, and/or destination device 120. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for advertising inspection capabilities to tune inspection configurations. For instance, the programs 622 may cause the computer 600 to perform techniques for communicating with other devices using any type of protocol or standard usable for determining connectivity. Additionally, the programs 622 may comprise instructions that cause the computer 600 to perform the specific techniques for advertising inspection capabilities.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining, by a first inspection device of a network, that a second inspection device is disposed within the network, the first inspection device and the second inspection device each configured to inspect traffic sent through the network;
   receiving, at the first inspection device and from the second inspection device, data indicating inspection capabilities associated with the second inspection device;
   determining, based at least in part on the inspection capabilities, that the second inspection device is better suited to perform a first type of inspection compared to second hardware of the first inspection device;
   receiving, at the first inspection device, a packet that is to be sent through the network along a path that includes the second inspection device;
   based at least in part on the path including the second inspection device and based at least in part on the second inspection device is better suited to perform the first type of inspection, refraining from performing the first type of inspection on a first portion the packet at the first inspection device such that the second inspection device performs the first type of inspection on the first portion of the packet;
   performing, at the first inspection device, a second type of inspection on a second portion of the packet, the second type of inspection different than the first type of inspection; and associating metadata with the packet, the metadata indicating that first inspection device performed the second type of inspection on the second portion of the packet.

2. The method of claim 1, wherein the metadata further indicates that the first inspection device refrained from performing the first type of inspection on the packet.

3. The method of claim 1, further comprising:
refraining from performing the second type of inspection on the second portion of the packet at the second inspection device based at least in part on the metadata.

4. The method of claim 1, further comprising establishing a secure communication channel between the first inspection device and the second inspection device based at least in part on determining that the second inspection device is disposed within the network, wherein the data indicating the inspection capabilities associated with the second inspection device is received via the secure communication channel.

5. The method of claim 1, further comprising, based at least in part on receiving the data indicating the inspection capabilities associated with the second inspection device, altering a configuration of the first inspection device such that the first inspection device refrains from performing the first type of inspection on subsequent packets that are to be sent along the path through the network.

6. The method of claim 1, further comprising:
sending, to the second inspection device, a second indication that the first inspection device is capable of performing a second type of inspection that is different than the first type of inspection; and
based at least in part on receiving the second indication, altering a configuration of the second inspection device such that the second inspection device:
performs the first type of inspection on subsequently received packets that are to be forwarded from the second inspection device to the first inspection device; and
refrains from performing the second type of inspection on the subsequently received packets.

7. The method of claim 1, wherein determining that the second inspection device is better suited to perform the first type of inspection is based at least in part on a number of types of inspections that the second inspection device is configured to perform, the number of the types of inspections advertised in the inspection capabilities.

8. The method of claim 1, wherein the metadata comprises a watermark that includes a first value indicating that the second type of inspection was performed on the second portion of the packet and a second value indicating that the first type of inspection was not performed on the first portion of the packet.

9. A system comprising:
one or more processors; and
one or more non-transitory computer-readable media storing instructions that, when executed by the one or more processors, cause the one or more processors to perform operations comprising:
determining, at a first inspection device of a network, that a second inspection device is disposed within the network, the first inspection device and the second inspection device each configured to inspect traffic sent through the network;
receiving, at the first inspection device and from the second inspection device, data indicating inspection capabilities associated with the second inspection device;
determining, based at least in part on the inspection capabilities, that the second inspection device is better suited to perform a first type of inspection compared to the first inspection device;
receiving, at the first inspection device, a packet that is to be sent through the network along a path that includes the second inspection device;
based at least in part on the path including the second inspection device and based at least in part on the second inspection device being better suited to perform the first type of inspection, refraining from performing the first type of inspection on a first portion of the packet at the first inspection device such that the second inspection device performs the first type of inspection on the first portion of the packet;
performing, at the first inspection device, a second type of inspection on a second portion of the packet, the second type of inspection different than the first type of inspection; and
associating metadata with the packet, the metadata indicating that first inspection device performed the second type of inspection on the second portion of the packet.

10. The system of claim 9, wherein the metadata further indicates that the first inspection device refrained from performing the first type of inspection on the first portion of the packet.

11. The system of claim 9, the operations further comprising:
refraining from performing the second type of inspection on the second portion of the packet at the second inspection device based at least in part on the metadata.

12. The system of claim 9, the operations further comprising establishing a secure communication channel between the first inspection device and the second inspection device based at least in part on determining that the second inspection device is disposed within the network, wherein the data indicating the inspection capabilities associated with the second inspection device is received via the secure communication channel.

13. The system of claim 12, the operations further comprising sending a second indication that the first inspection device is capable of performing the first type of inspection or the second type of inspection to the second inspection device via the secure communication channel.

14. The system of claim 9, the operations further comprising, based at least in part on receiving the data indicating the inspection capabilities associated with the second inspection device, altering a configuration of the first inspection device such that the first inspection device refrains from performing the first type of inspection on subsequent packets that are to be sent along the path through the network.

15. The system of claim 9, the operations further comprising:
sending, to the second inspection device, a second indication that the first inspection device is capable of performing the second type of inspection that is different than the first type of inspection; and
based at least in part on receiving the second indication, altering a configuration of the second inspection device such that the second inspection device:
performs the first type of inspection on subsequently received packets that are to be forwarded from the second inspection device to the first inspection device; and
refrains from performing the second type of inspection on the subsequently received packets.

16. The system of claim 9, wherein the metadata comprises a watermark that includes a first value indicating that the second type of inspection was performed on the second portion of the packet and a second value indicating that the first type of inspection was not performed on the first portion of the packet.

17. A non-transitory computer-readable media storing instructions that, when executed by one or more processors, cause the one or more processors to perform operations comprising:

determining, by a first inspection device of a network, that a second inspection device is disposed within the network, the first inspection device and the second inspection device each configured to inspect traffic sent through the network;

receiving, at the first inspection device and from the second inspection device, data indicating inspection capabilities associated with the second inspection device;

determining, based at least in part on the inspection capabilities, that the second inspection device is better suited to perform a first type of inspection compared to second hardware of the first inspection device;

receiving, at the first inspection device, a packet that is to be sent through the network along a path that includes the second inspection device;

based at least in part on the path including the second inspection device and based at least in part on the second inspection device is better suited to perform the first type of inspection, refraining from performing the first type of inspection on a first portion the packet at the first inspection device such that the second inspection device performs the first type of inspection on the first portion of the packet;

performing, at the first inspection device, a second type of inspection on a second portion of the packet, the second type of inspection different than the first type of inspection; and     associating metadata with the packet, the metadata indicating that first inspection device performed the second type of inspection on the second portion of the packet.

18. The non-transitory computer-readable media of claim 17, wherein the metadata comprises a watermark that includes a first value indicating that the second type of inspection was performed on the second portion of the packet and a second value indicating that the first type of inspection was not performed on the first portion of the packet.

19. The non-transitory computer-readable media of claim 17, the operations further comprising establishing a secure communication channel between the first inspection device and the second inspection device based at least in part on determining that the second inspection device is disposed within the network, wherein the data indicating the inspection capabilities associated with the second inspection device is received via the secure communication channel.

20. The non-transitory computer-readable media of claim 17, the operations further comprising, based at least in part on receiving the data indicating the inspection capabilities associated with the second inspection device, altering a configuration of the first inspection device such that the first inspection device refrains from performing the first type of inspection on subsequent packets that are to be sent along the path through the network.

\* \* \* \* \*